(12) United States Patent
Savidis et al.

(10) Patent No.: US 11,282,414 B2
(45) Date of Patent: Mar. 22, 2022

(54) REDUCED OVERHEAD GATE LEVEL LOGIC ENCRYPTION

(71) Applicants: Drexel University, Philadelphia, PA (US); Ioannis Savidis, Wallingford, PA (US); Kyle Juretus, Quakertown, PA (US)

(72) Inventors: Ioannis Savidis, Wallingford, PA (US); Kyle Juretus, Quakertown, PA (US)

(73) Assignee: Drexel University, Philadelphia, PA (US)

( * ) Notice: Subject to any disclaimer, the term of this patent is extended or adjusted under 35 U.S.C. 154(b) by 100 days.

(21) Appl. No.: 15/770,380

(22) PCT Filed: Oct. 24, 2016

(86) PCT No.: PCT/US2016/058393
§ 371 (c)(1),
(2) Date: Apr. 23, 2018

(87) PCT Pub. No.: WO2017/123305
PCT Pub. Date: Jul. 20, 2017

(65) Prior Publication Data
US 2018/0315351 A1  Nov. 1, 2018

Related U.S. Application Data

(60) Provisional application No. 62/338,142, filed on May 18, 2016, provisional application No. 62/245,155, filed on Oct. 22, 2015.

(51) Int. Cl.
*H04L 29/00* (2006.01)
*G09C 1/04* (2006.01)
(Continued)

(52) U.S. Cl.
CPC ............... *G09C 1/04* (2013.01); *G06F 21/72* (2013.01); *G06F 30/39* (2020.01); *G09C 1/00* (2013.01);
(Continued)

(58) Field of Classification Search
CPC ....... G09C 1/04; G06F 17/5068; G06F 21/72; H04L 9/08
(Continued)

(56) References Cited

U.S. PATENT DOCUMENTS 7,242,219 B1 * 7/2007 Mahurin .............. H03K 19/215
326/52
7,290,151 B2 * 10/2007 Wuidart .................. H04L 9/003
713/194

(Continued)

OTHER PUBLICATIONS

Kyle Juretus, Ioannis Savidavis "Reducing Logic Encryption Overhead Through Gate Level Key Insertion", 2016, IEEE, pp. 1714-1717 (Year: 2016).*

(Continued)

*Primary Examiner* — Jeffrey C Pwu
*Assistant Examiner* — Michael D Anderson
(74) *Attorney, Agent, or Firm* — Schott, P.C.

(57) ABSTRACT

There are several approaches to encrypting circuits: combination logic encryption, encrypted gate topologies, transmission gate topologies, and key expansion of gate topologies. One of the approaches provides a circuit having a gate topology comprising a logic gate with integrated key transistors, where the key transistors comprise at least a PMOS stack and an NMOS stack. The PMOS stack comprises a first PMOS switch and a second PMOS switch, where the first and the second PMOS switches have sources to a voltage source and drains that serve as a source to a third PMOS switch. The NMOS stack comprises a first NMOS switch and a second NMOS switch, where the first and the second (Continued)

NMOS switches have sources to ground and drains that serve as a source to a third NMOS switch. Each of the above approaches may encrypt a circuit with certain advantages in delay and power consumption.

8 Claims, 8 Drawing Sheets

(51) Int. Cl.
  *G09C 1/00*     (2006.01)
  *G06F 30/39*    (2020.01)
  *G06F 21/72*    (2013.01)
  *H04L 9/08*     (2006.01)

(52) U.S. Cl.
  CPC .......... *H04L 9/08* (2013.01); *H04L 2209/046* (2013.01); *H04L 2209/12* (2013.01); *H04L 2209/122* (2013.01); *H04L 2209/16* (2013.01)

(58) Field of Classification Search
  USPC .......................................................... 380/43
  See application file for complete search history.

(56) References Cited

U.S. PATENT DOCUMENTS

| | | | |
|---|---|---|---|
| 8,111,089 | B2 | 2/2012 | Cocchi et al. |
| 9,317,087 | B2 * | 4/2016 | Ramaraju ................. G06F 1/26 |
| 2005/0002523 | A1 * | 1/2005 | Sonnekalb .............. H04L 9/003 |
| | | | 380/28 |

OTHER PUBLICATIONS

"Impacts of counterfeiting and piracy to reach US $1.7 trillion by 2015," International Chamber of Commerce, published on Feb. 2, 2011, accessed at https://web.archive.org/web/20150924060458/http://www.iccwbo.org/News/Articles/2011/Impacts-of-counterfeiting-and-piracy-to-reach-US$1-7-trillion-by-2015/, accessed on Sep. 9, 2018, page1.

"IP Challenges for the Semiconductor Equipment and Materials Industry," Semiconductor Equipment and Materials International (SEMI), pp. 1-5 (Jun. 2012).

"Trends in the global IC design service market," Age Yeh, DIGITIMES Research, Taipei, published on Mar. 13, 2012, accessed at http://www.digitimes.com/news/a20120313RS400.html?chid=2, accessed on Sep. 9, 2018, pp. 9.

Alkabani Y. and Farinaz, K., "Active Hardware Metering for Intellectual Property protection and Security," Proceedings of the USENIX Security Symposium, pp. 291-306 (Aug. 2007).

Baumgarten, A., et al., "Preventing IC Piracy Using Reconfigurable Logic Barriers," IEEE Design & Test of Computers, vol. 27, No. 1, pp. 66-76 (Feb. 2010).

Chakraborty, S., and Bhunia, S., "HARPOON: An Obfuscation-Based SoC Design Methodology for Hardware Protection," IEEE Transactions on Computer-aided Design of Integrated Circuits and Systems, vol. 28, No. 10, pp. 1493-1502 (Oct. 2009).

Jeyavijayan, R., et al., "Fault Analysis-Based Logic Encryption," IEEE Transactions on Computers, vol. 64, No. 2, pp. 410-424 (Feb. 2015).

Jeyavijayan, R., et al., "Logic Encryption: A Fault Analysis Perspective," Automation & Test in Europe Conference & Exhibition (DATE) 2012 Design, pp. 953-958 (Oct. 2012).

Jeyavijayan, R., et al., "Regaining Trust in VLSI Design: Design-for-Trust Techniques," Proceedings of the IEEE, vol. 102, No. 8, pp. 1266-1282 (Jul. 2014).

Juretus, K., and Savidis, I., "Reducing Logic Encryption Overhead Through Gate Level Key Insertion," 2016 IEEE International Symposium on Circuits and Systems (ISCAS), pp. 1-4 (2016).

Juretus, K., and Savidis, I., "Reduced Overhead Gate Level Logic Encryption," 2016 International Great Lakes Symposium on VLSI (GLSVLSI), pp. 1-6 (2016).

Roy, J., et al., "EPIC: Ending Piracy of Integrated Circuits," Proceedings of the IEEE/ A CM Design, Automation and Test in Europe, pp. 1069-1074, (Oct. 2008).

Semiconductor Equipment and Materials Industry, "Intellectual Property (IP) Challenges and Concerns of the Semiconductor Equipment and Materials Industry," accessed at https://web.archive.org/web/20131228193027/http://www.semi.org/cms/groups/public/documents/web_content/p043701.pdf, accessed on Sep. 9, 2017, pp. 17.

Tehranipoor, M., and Koushanfar, F., "A Survey of Hardware Trojan Taxonomy and Detection," IEEE Design and Test of Computers, vol. 27, No. 1, pp. 10-25 (Feb. 2010).

Torrance, R., and James, D., "The State-of-the-Art in Semiconductor Reverse Engineering," 2011 48th ACM/EDAC/IEEE Design Automation Conference (DAC), pp. 333-338 (Jun. 2011).

Juretus et al., "Low Overhead Gate Level Logic Encryption." 41 st Annual GOMACTech Conference. Mar. 2016 (Mar. 2016), Fig 3, 4, p. 455-458 [online] <URL:http://ece.drexel.edu/savidis/publications/G0MAC_16b.pdf >.

PCT, International Search Report for PCT/US16/58393, dated Jul. 6, 2017.

PCT, Written Opinion of the International Search Authority for PCT/US16/58393, dated Jul. 6, 2017.

* cited by examiner

REDUCED OVERHEAD GATE LEVEL LOGIC ENCRYPTION

BACKGROUND

The use of integrated circuits (ICs) in many applications that benefit society including banking, transportation, energy, health, and the military, continues to expand. While use in such fields presents potential benefits, the increasing reliance on third-parties has introduced security and reliability concerns. One concern is the increasing reliance on third-party foundries, as in-house fabrication facilities in advanced technologies cost in excess of $5 billion US dollars. Since a third-party foundry has access to the IC design, typically in the GDS-II format, and has the required tools and knowledge to reverse engineer a design from the GDS-II file alone, utilizing an untrusted third-party foundry presents threats to an IC.

An untrusted third-party foundry is capable of intellectual property (IP) theft, IC counterfeiting, IC overproduction, and the insertion of malicious circuitry (hardware Trojans). Counterfeiting and piracy were expected to cause losses of $1.7 trillion dollars in 2015, and a 2008 analysis conducted by SEMI estimated an IP revenue loss of $4 billion dollars to the IC industry alone. While the monetary concerns of utilizing untrusted third parties are significant, a greater danger is the use of ICs that do not meet the original specifications required for the target application. ICs that do not meet specifications cause increased failure rates and produce logical errors. In addition, there is a potential risk of malicious hardware Trojans being embedded within the ICs. Hardware Trojans inserted into the IC aim to deny service, steal information, and/or cause incorrect functionality. Even with methods to detect hardware Trojans, there is the possibility that the Trojan executes without the knowledge of the end-user of the circuit. An area of research that has emerged to reduce the security risks of IP theft, IC counterfeiting, IC overproduction, and hardware Trojan insertion is logic encryption.

Logic encryption adds additional circuitry (key gates) to a design in order to hide the functionality from an adversary. Without the application of the correct input key, the IC will not function correctly. Essentially, a malicious foundry no longer possesses all of the information to reverse engineer the entire design, making it more difficult to steal the IP, counterfeit the IC, produce extra ICs, and even insert hardware Trojans, as the adversary is not certain what effects the IC's correct functionality has on the Trojan.

One security measure that aims to prevent IP theft, IC counterfeiting and overproduction, and the insertion of hardware Trojans is logic encryption. Logic encryption exists in both sequential and combinational methodologies. Sequential logic encryption typically involves the application of a required sequence before correct circuit operation (normal mode) is achieved. An example of sequential logic encryption is shown in FIG. 1A, where the sequence of P0, P1, and P2 must be entered in obfuscated mode before the IC operates correctly, otherwise the circuit is rendered not functional.

Combinational logic encryption adds key gates to the circuit, requiring the adversary to determine the key before functionality is obtained. In addition, combinational logic encryption changes the logic within the circuit, creating additional obfuscation over sequential logic encryption and therefore providing an advantage against IP theft. Without the key, it is also more difficult for an adversary to counterfeit or overproduce an IC, as the functionality of the circuit is unknown. Logic encryption also prevents the insertion of hardware Trojans, as the entire design is no longer known to an adversary, making it more difficult to insert a Trojan without causing unintended actions that are more readily detected.

While combinational logic encryption provides a method to increase IC security against a multitude of threats, current logic encryption techniques result in high overheads in performance, power, and area.

Some logic encryption may use XOR gates (or a gate of similar functionality) or replaces the original gate with a look-up table (LUT) utilizing a 4×1 MUX. While XOR or LUT based implementations offer a means to increase security, the per-gate area, power, and performance overhead are high. In order to utilize the security benefits of logic encryption in a wide array of IC applications, the per-gate overhead must be reduced

SUMMARY OF THE EMBODIMENTS

There are several approaches to encrypting circuits: combination logic encryption, encrypted gate topologies, transmission gate topologies, and key expansion of gate topologies. Each of these may encrypt a circuit with certain advantages in delay and power consumption.

DETAILED DESCRIPTION OF THE EMBODIMENTS

1. Combinational Logic Encryption

Combinational logic encryption alters the logic structure by requiring a key to enable the correct operation of the IC. Two logic encryption techniques may include: 1) the use of XOR/XNOR gates and 2) the insertion of a LUT as a gate replacement. A technique based on the insertion of 2×1 MUXes may also be possible. The inputs to the 2×1 MUX include the correct input and a net that carries the negated logical value of the correct input. The key input is the select signal of the 2×1 MUX. Finding a net that consistently negates the desired output is challenging and limits the use of the 2×1 MUX in logic encryption. An overview of the implementation of the XOR and LUT based logic encryption techniques follows.

1.1 XOR Based Encryption

Figure 1:
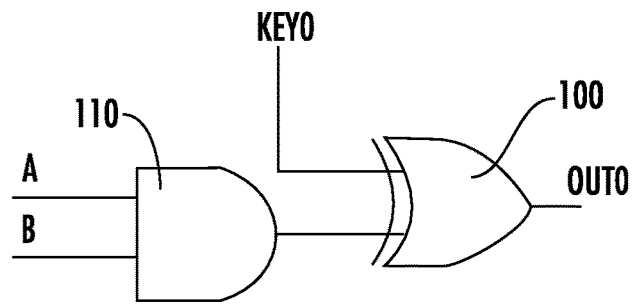
FIG. 1 shows logic encryption with use of an XOR gate.
Figure 1A:
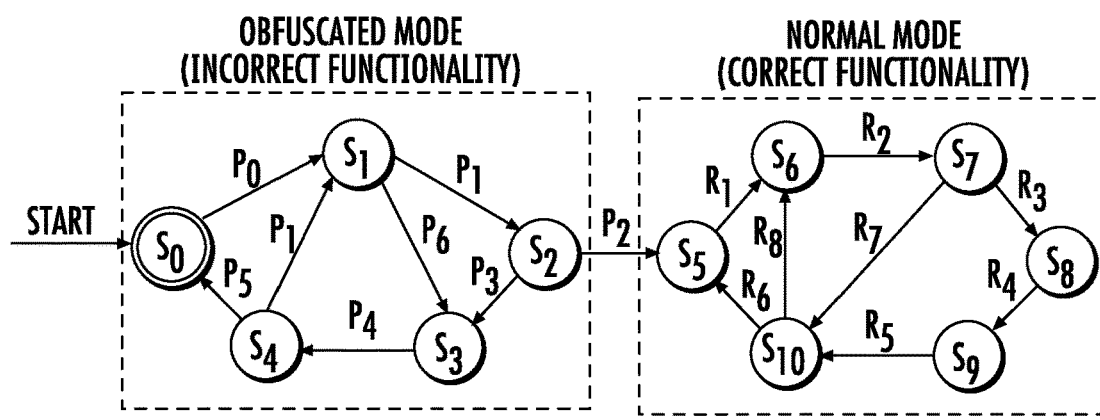
FIG. 1A shows a modified state transmission graph.

FIG. 1 shows an illustration of a case of adding an XOR gate 100 following an AND gate 110 to implement a key input. When key input KEY0 is 1, the XOR gate 100 behaves as an inverter and when KEY0 is 0, the XOR acts as a buffer. Therefore, when KEY0 is 1, an incorrect value is obtained on OUT0. To deter adversaries from knowing the key based on the implementation of the key gate (i.e. an XOR/XNOR gate), inverters may be added in select locations, essentially inverting the key. The additional inverters, however, may add overhead on top of the overhead already incurred to implement the key gate itself.

1.2. LUT Based Encryption

A look-up table may also implement a key gate. A 4×1 MUX structure 200 that is able to encrypt the functionality of a single gate is shown in FIG. 2.

Instead of the single key value KEY0, the key values 210 are passed to the inputs of the 4×1 MUX, which sets the functionality of the gate. Using a 4×1 MUX structure allows for the realization of any 2-input function 220 as opposed to the simple inversion provided by the XOR gate. Note that the illustration in FIG. 2 does not include any memory elements attached to the inputs of the 4×1 MUX, as memory is not explicitly required to encrypt the functionality of a gate. If memory is used in a design, the per-gate encryption overhead increases drastically.

Figure 2:
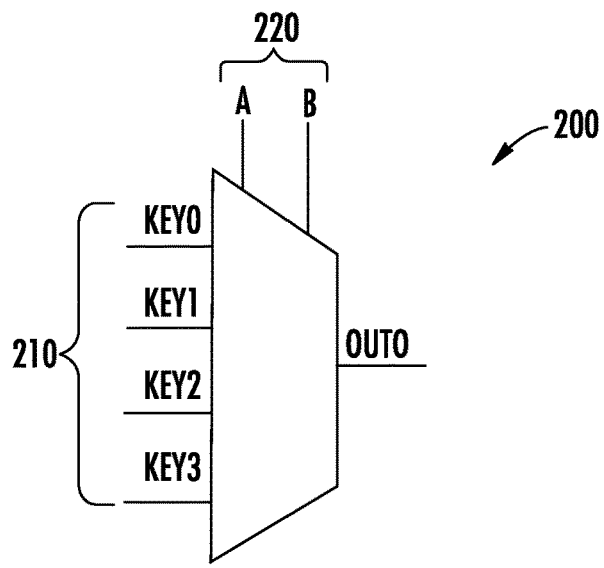
FIG. 2 shows logic encryption with the use of a 4×1 multiplexor.

In a solution such as the one of FIG. 2, the original gate may be completely replaced, leaving little information pertaining to the original functionality. The masked functionality of a gate encrypted with the LUT technique is dissimilar to the XOR based logic encryption method, which may require additional inverters to mask the key value, as described above.

2. Overhead of Logic Encryption

The XOR and LUT based logic encryption techniques both hinder the ability of a malicious actor to use an IC, but the per-gate overheads of both may be high. An analysis of the performance, power, and area penalties associated with encrypting a standard logic gate for both methods may be found in this application. Note that for the cost analysis, no inverters were added after the XOR encryption gates, and no memory elements were used for the LUT based approach. The values provided for the per-gate overhead of each method are therefore highly optimistic as compared to implementations that include the inverters and memory.

In overhead testing, an IBM 180 nm process design kit with a standard drive strength for each gate to test the overhead associated with each technique. Table 1 shows an analysis of the propagation delay, power, and area of standard cells.

TABLE 1

| Standard Cell | Prop. Delay (ps) | Power (nW) | Area (μm²) |
|---|---|---|---|
| AND | 69.79 | 70.40 | 30.73 |
| NAND | 36.71 | 72.67 | 23.25 |
| OR | 92.90 | 64.52 | 30.73 |
| NOR | 42.09 | 96.85 | 23.25 |
| XOR | 91.23 | 148.0 | 45.69 |
| XNOR | 106.7 | 204.6 | 41.62 |

The drive strength of the encrypted and original gate were matched, and each drove a load capacitance of 5 fF. Table 2 shows an analysis of the propagation delay, power, and area of XOR based logic encryption. Per-gate overheads are provided as percent increases over the standard cell values listed in Table 1.

TABLE 2

| Standard Cell | Prop. Delay (ps) | Power (nW) | Area (μm²) |
|---|---|---|---|
| AND | 151.3 (116.8%) | 150.4 (113.6%) | 63.73 (107.4%) |
| NAND | 127.6 (247.6%) | 142.2 (95.68%) | 63.73 (174.1%) |
| OR | 157.5 (69.54%) | 174.6 (170.6%) | 63.73 (107.4%) |
| NOR | 134.3 (219.1%) | 168.5 (73.98%) | 63.73 (174.1%) |
| XOR | 181.8 (99.27%) | 219.3 (48.18%) | 84.50 (84.94%) |
| XNOR | 201.3 (88.66%) | 226.3 (10.61%) | 84.50 (101.4%) |
| Average | 140.2% | 85.45% | 124.9% |

Similarly, the overheads of the LUT based logic encryption method are listed in Table 3, which shows an analysis of the propagation delay, power, and area of 4×1 MUX based logic encryption. Per-gate overheads are provided as percent increases over the standard cell values listed in Table I.

TABLE 3

| Standard Cell | Prop. Delay (ps) | Power (nW) | Area (μm²) |
|---|---|---|---|
| AND | 122.5 (75.53%) | 146.0 (107.4%) | 90.58 (194.8%) |
| NAND | 124.6 (239.4%) | 157.0 (116.0%) | 90.58 (289.6%) |
| OR | 120.8 (30.03%) | 142.2 (120.4%) | 90.58 (194.8%) |
| NOR | 126.8 (201.3%) | 158.8 (63.96%) | 90.58 (289.6%) |
| XOR | 124.0 (35.92%) | 191.8 (29.59%) | 90.58 (98.25%) |
| XNOR | 124.6 (16.78%) | 191.7 (6.310%) | 90.58 (115.9%) |

The overheads in terms of power, area, and performance observed in Tables 2 and 3 limit the use of such techniques in many applications. The large overhead for per gate encryption limits the acceptable signal paths to place gates without decreasing performance. In addition, the total number of encrypted gates placed in a circuit may be limited by power and area constraints.

3. Encrypted Gate Topologies

Gate level encryption may provide alternatives in the circuits shown in FIGS. 1 and 2. Looking at the FIG. 1 circuit; to encrypt the AND gate 110, an additional XOR gate 100 is added to the output of the AND. The additional XOR gate may increase the delay, area, and power consumption of the circuit. Similarly, logic encryption that uses 4×1 MUXes adds a large area overhead and creates additional levels of logic that decreases performance, as listed in Table 3. Instead of inserting an extra gate in the logic path, as the XOR encryption method does, or using a large area, as the 4×1 MUX technique does, gate level designs with embedded security capabilities may reduce the overhead associated with previous logic encryption implementations.

3.1 Stack-Based Topology

Figure 3:
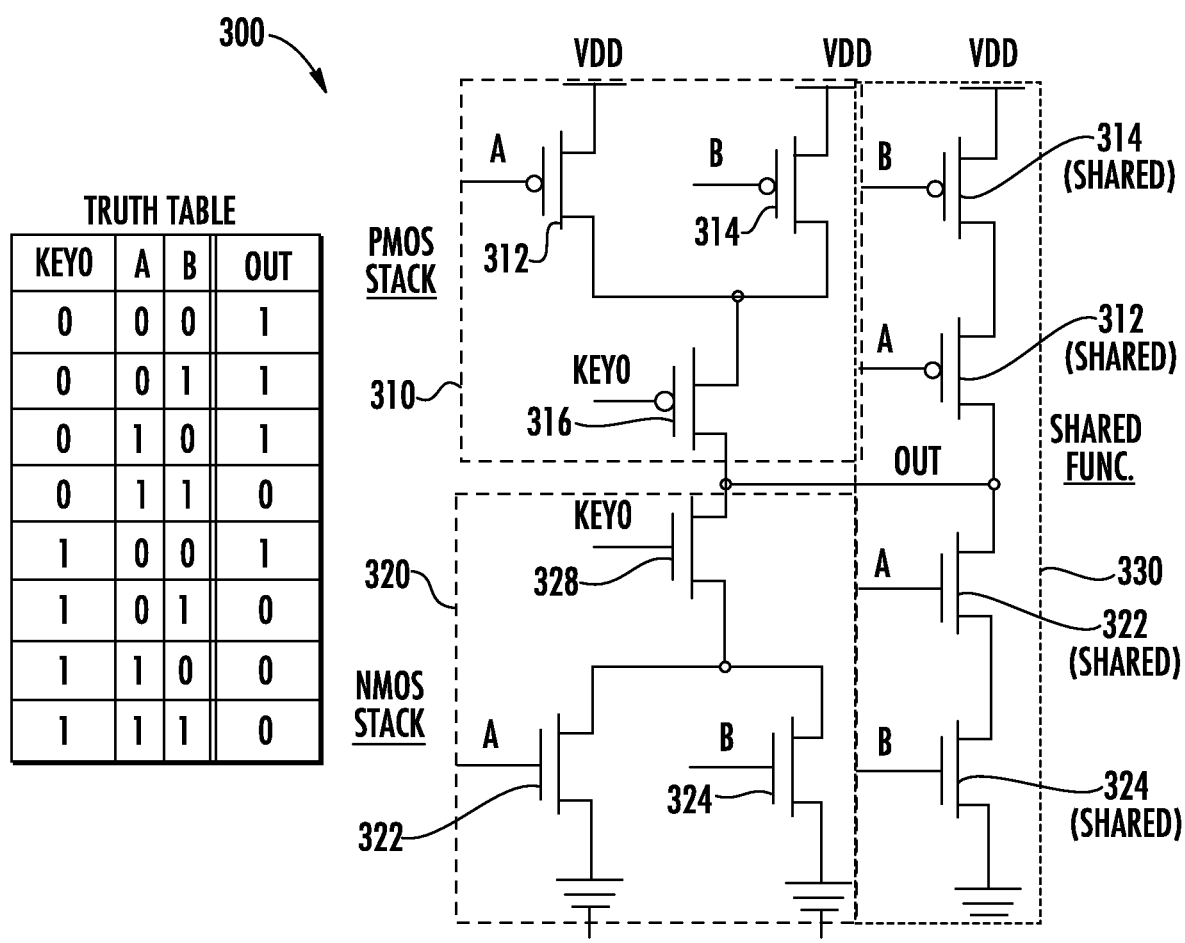
FIG. 3 shows a stack-based topology implementing a NAND or NOR gate depending on a value of KEY0.

FIG. 3 shows a stack-based topology 300 implementing a NAND or NOR gate depending on the value of KEY0. When KEY0 is 0, the PMOS stack 310 is activated allowing the gate to behave as a NAND. When KEY0 is set to 1, the NMOS stack 320 is activated allowing the gate to behave as a NOR. The benefit of such a topology is that one of the stacks is essentially disconnected from OUT, limiting the capacitance connected to OUT during execution, which reduces power consumption and limits the degradation in performance.

The stack configuration 300 includes a shared functionality 330 between the implemented logic of the gates. For example, a NAND and NOR gate share the same output for two of the four input combinations of A and B. Having shared functionality eliminates the need for an additional transistor with a key input, such as when A and B are 0. Eliminating a transistor for certain input combinations reduces the area and power consumption, as well as reducing the number of transistors in series in the stack, which further degrades performance. The NAND/NOR stack-based gate also has another important characteristic: the ability to forgo negated input logic. While the NAND/NOR configuration does not require negated logic, most designs implementing the stack-based topology do, as the ability to turn-on both PMOS and NMOS logic requires both logic high and logic low.

The stack-based topology may be used when all the input combinations do not require the generation of an incorrect output when an incorrect key is applied. If, however, applying an incorrect key requires the generation of an incorrect output for all input combinations, such as the case when using the XOR based technique, the stack-based topology is not as beneficial as more power and area are required.

Reviewing the stack-based topology shown in FIG. 3 with specificity, there is a PMOS stack 310, an NMOS stack 320, both of which may be considered as key transistors, and a block of shared functionality 330 between the NAND and NOR functional descriptions. The NMOS stack 320 comprises two NMOS transistors (or switches) 322, 324, each with source to ground 326, and a drain that serves as the source to a third NMOS transistor 328. The first NMOS transistor 322 receives an input A and the second NMOS transistor 324 receives an input B. The third NMOS transistor 328 receives an input KEY0 and its drain connects to the output, labeled OUT, of the gate.

Similarly, the PMOS stack 310 comprises two PMOS transistors 312, 314, each with source to voltage drain VDD, which in this example is 1.8V, and a drain that serves as the source to a third PMOS transistor 316. The first PMOS transistor 312 in the stack gate topology receives an input A and the second PMOS transistor 314 receives an input B. The third PMOS transistor 316 in the PMOS stack 310 receives an input KEY0 and the drain connects to the output, labeled OUT, of the gate.

The shared functionality 330 between the NAND and NOR gates is applicable when inputs A and B are both ground or VDD. The shared functionality 330 when both A and B are set to VDD includes an NMOS with source connected to ground and drain connected to another NMOS with the input supplied by A. The NMOS with input A has the drain connected to the output of the gate OUT. The shared functionality when both A and B are set to ground includes a PMOS with source connected to VDD and drain connected to another PMOS with the input supplied by A. The PMOS with input A has the drain connected to the output of the gate OUT.

3.2 Transmission Gate Topology

The key value is passed through the transmission gates to reduce the impact on the area and performance of the replicated logic. Therefore, the total number of transistors and the transistors the key values pass through may be reduced. With the key value passed through the transmission gates, the circuit 400 shown in FIG. 4 may be better suited to replicate the XOR based method. If logic low is applied to either input A or input B the value of KEY0 is passed to OUT. Similarly, when input A and input B are both logic high the value of key input KEY1 is passed to OUT.

A similar circuit may be used to produce an OR/NOR gate by inverting the A and B inputs to the transmission gates. Such a modification passes the value of KEY0 when input A or B is logic high, and passes the value of KEY1 when inputs A and B are both low.

Two keys are not necessary, as KEY0 and KEY1 are simply the inversion of one another when implementing a AND/NAND gate or OR/NOR gate. However, using two distinct keys allows for key expansion, which relies on the constant 0 and 1 functions that are generated from the transmission gate topology shown in FIG. 4 when KEY0 and KEY1 are both 0 or 1, respectively. Generating a constant 0 or 1 on the output line allows for the use of either value (0 or 1) as a key input while connecting inputs A and B to arbitrary nets within the circuit. An adversary now has a more difficult task to determine the key nets in a circuit and render the circuit functional, and must apply more key combinations to decipher the correct key.

The encryption of an XOR or XNOR gate or other logical gates may be more complex. The logic of an XOR or XNOR logical gate does not include the same logic minimization that an AND, OR, NAND, or NOR gate possess. While AND, OR, NAND, and NOR gates all include simplifications that reduce the number of transistors required to implement the function, the only simplification that is possible for the XOR or XNOR gates is to eliminate one of the key inputs. The number of keys is therefore reduced for a single gate from four to three by tying KEY1 and KEY2 together to form a single key input, as shown in FIG. 2. Reducing the number of key bits required per gate is important if there is a strict area and power overhead requirement.

Figure 4:
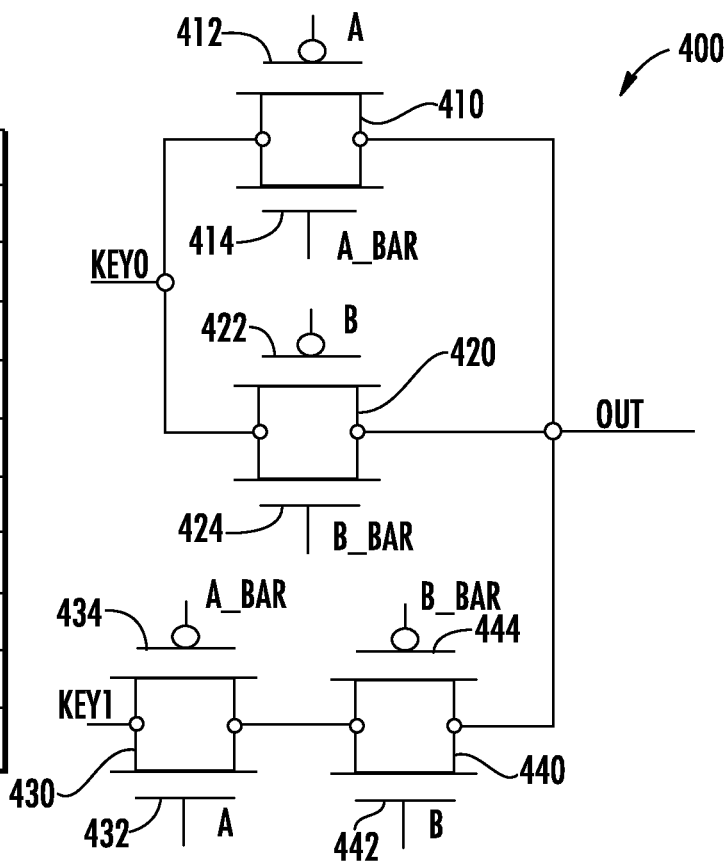
FIG. 4 shows a transmission gate based topology implementing an AND/NAND depending on the values of KEY0 and KEY1.

The transmission gate topology shown in FIG. 4 includes logic to supply KEY0 to the gate output OUT when input A or B is connected to ground and logic to pass KEY1 to OUT when inputs A and B are both connected to VDD. The logic passing the value of KEY0 to OUT may use two parallel paths. The upper path through transmission gate one 410 connects KEY0 to one terminal of a PMOS (PMOS switch) 412 shorted with one terminal of an NMOS (NMOS switch) 414 that form the transmission gate one 410. The PMOS 412 and NMOS 414 receive inputs A and A_BAR, respectively. The PMOS 412 and NMOS 414 each have a second terminal shorted together that connects to the output OUT of the gate 410. The lower path passing through transmission gate two 420 connects KEY0 to one terminal of a PMOS 422 shorted with one terminal of an NMOS 424 to form a second transmission gate 420. The PMOS 422 and NMOS 424 receive inputs B and B_BAR, respectively. The PMOS 422 and NMOS 424 each have a second terminal shorted together that connects to the output OUT of the gate 420.

The logic that connects KEY1 to the output node includes KEY1 applied to one terminal of a PMOS 432 shorted with one terminal of an NMOS 434 that form a transmission gate three 430. The PMOS 432 and NMOS 434 receive inputs A_BAR and A, respectively. The second shorted terminal connection of the PMOS and NMOS transistors 432, 434 is connected to one terminal of a PMOS 442 shorted with one terminal of an NMOS 444 that form transmission gate four 440. The PMOS 442 and NMOS 444 receive inputs B_BAR and B, respectively. The PMOS 442 and NMOS 444 of transmission gate four 440 each have a second terminal shorted together that connects to the output OUT of the gate.

4. Evaluation of Power, Area, and Performance

The drive strengths of the encrypted cells were matched with those of the XOR and LUT based logic encryption techniques. In order to match the drive strength, an inverter was added to the output of both the stack and transmission gate topologies. The functionality of the stack-based design is therefore an AND/OR gate as opposed to a NAND/NOR. The improvements over the XOR and LUT based encryption techniques are listed in Tables 4, 5, and 6. The improvement in performance is described as a reduction in propagation delay. The power is based on the average power of each gate. The area improvement is based on an area estimate determined from a non-optimized layout of the encryption gates as compared with layouts of the XOR and LUT encryption methods.

The results demonstrate the ability of gate level logic encryption to lower the overheads in area, power, and performance. The reductions in overhead provide more flexibility in the potential placement and quantity of encrypted gates within an IC design.

Table 4 shows propagation delay, power, and area analysis of the AND/OR implemented with stack-based encryption. Percent improvements over XOR and LUT logic encryption are listed.

| Comp. | Standard Cell | Prop. Delay (ps) | Power (nW) | Area ($\mu m^2$) |
|---|---|---|---|---|
| XOR | AND | 119.8 (20.82%) | 80.72 (46.33%) | 41.62 (34.77%) |
|  | OR | 116.7 (25.90%) | 79.87 (54.26%) |  |
| LUT | AND | 119.8 (2.204%) | 80.72 (44.71%) | 41.62 (54.05%) |
|  | OR | 116.7 (3.394%) | 79.87 (43.83%) |  |

Table 5 shows propagation delay, power, and area analysis of the NAND/AND implemented with transmission gate encryption. Percent improvements over XOR and LUT logic encryption are listed.

TABLE 5

| Comp. | Standard Cell | Prop. Delay | Power (nW) | Area ($\mu m^2$) |
|---|---|---|---|---|
| XOR | AND | 80.19 (46.99%) | 85.41 (43.21%) | 51.10 (19.81%) |
|  | NAND | 98.54 (22.77%) | 101.0 (28.97%) |  |
| LUT | AND | 80.19 (34.54%) | 85.41 (41.50%) | 51.10 (43.58%) |
|  | NAND | 98.54 (20.91%) | 101.0 (35.67%) |  |

Table 6 shows propagation delay, power, and area analysis of the NOR/OR implemented with transmission gate encryption. Percent improvements over XOR and LUT logic encryption are listed.

TABLE 6

| Comp. | Standard Cell | Prop. Delay (ps) | Power (nW) | Area ($\mu m^2$) |
|---|---|---|---|---|
| XOR | OR | 86.99 (44.77%) | 91.44 (47.63%) | 51.10 (19.81%) |
|  | NOR | 96.77 (27.94%) | 88.00 (47.78%) |  |
| LUT | OR | 86.99 (27.99%) | 91.44 (35.70%) | 51.10 (43.58%) |
|  | NOR | 96.77 (23.68%) | 88.00 (44.58%) |  |

Encrypting an AND gate with the transmission gate topology results in a power reduction of 43.2%, an estimated area reduction of 19.8%, and a performance increase of 46.9% as compared to an XOR based implementation. Similar improvements are achieved with the stack-based topology, demonstrating that gate level logic encryption is an effective technique to mask circuit functionality while lowering the implementation cost of securing an IC from IP theft and attack.

5. Key Expansion

Figure 5:
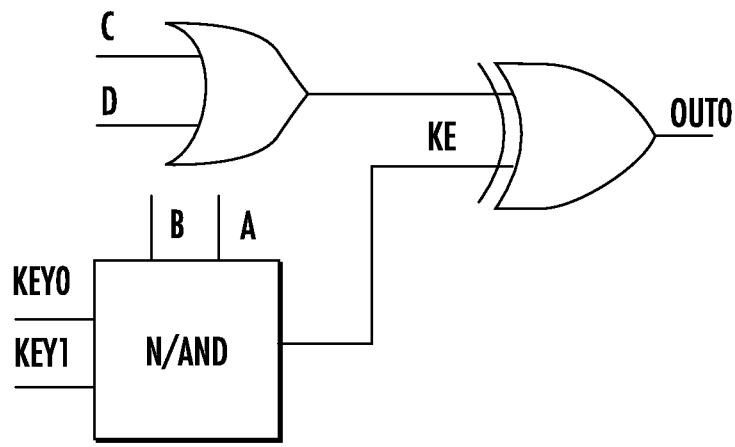
FIG. 5 shows key expansion using a net KE as a standard key input.

The transmission gate topology shown in FIG. 5 has the ability to output a constant logic low or a constant logic high independent of the inputs A and B. The number of key combinations an adversary must consider effectively doubles when using the constant outputs of the transmission gate topology, while still achieving the reduction in overhead provided by gate level logic encryption. The ability to use the constant outputs to expand the key search space of an adversary is coined key expansion. What follows are circuit topologies that use the constant low and constant high output of the transmission gate logic encryption family to force an adversary to consider a larger key search space.

5.1 Key Expansion: Transmission Gate Topology

Key expansion may be successfully included into a circuit when the expanded key appears to be a standard case of logic encryption. As a result, one encrypted gate may not be directly connected to the key input of another encrypted gate. FIG. 5 shows the first topology that encrypts the input keys, where the net labeled KE represents the key expanded net. For the topology shown in FIG. 5, A and B are inputted from nearby nets, providing the appearance that the encrypted gate is a NAND or AND. However, when KEY0 is equal to KEY1, a constant value is generated on KE, essentially replicating the XOR based encryption technique. The topology shown in FIG. 5 also functions when the XOR gate is replaced by another standard gate such as an AND or OR. For the case that the XOR is replaced with an OR, if a controlling value is generated on KE, then OUT0 is a corrupted version of the output of the OR gate.

Figure 6:
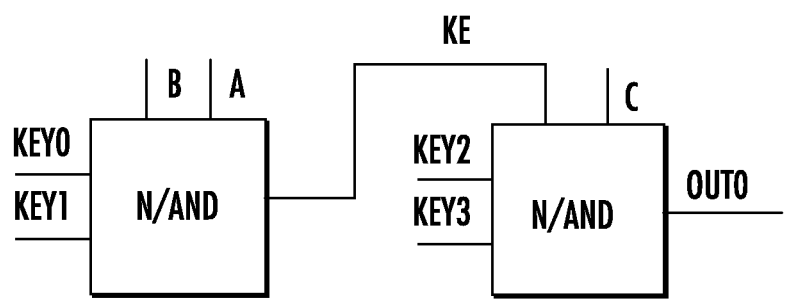
FIG. 6 shows a key expansion topology with two NAND/AND gate level logic encryption.

Another topology that allows for key expansion is shown in FIG. 6. The output of a gate level logic encryption instance is connected to one of the logical inputs of another encrypted instance. The topology appears to be a standard logical connection within the circuit, however, key expansion is implemented by holding the KE net constant. When KE is held at a constant high, OUT0 is either C, the inversion of C, a constant 0, or a constant 1 depending on the values of KEY2 and KEY3. The AND/NAND structure no longer functions as an AND/NAND gate, forcing an adversary to explore more key input combinations.

Figure 7:
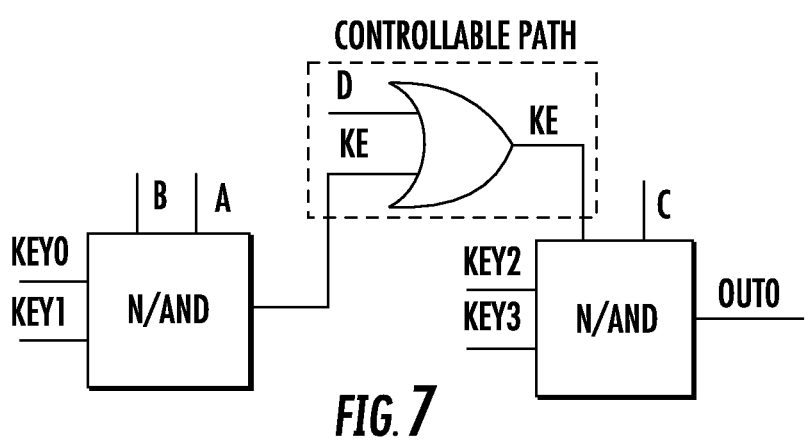
FIG. 7 shows a controllable path insertion to mask key expansion.

The topology shown in FIG. 7 is an expanded use case of the topology in FIG. 6. Instead of directly connecting the output of one encrypted gate to another, a controllable path that includes a 4th input D within the circuit is used to disguise the use of key expansion. The modified circuit makes it more difficult for an adversary to associate the given topology with key expansion.

While the presented key expansion topologies present opportunities to use the constant output cases of the transmission gate logic encryption, the overheads of the topologies are larger than a standard encrypted gate. As such, a circuit may include the budget for the implementation of the XOR or LUT based logic encryption techniques. For example, the c432 ISCAS benchmark implemented with the fault-based XOR logic encryption technique has a performance overhead of approximately 10%, a power overhead of 55%, and an area overhead of 57%. Although the impact on performance requires further investigation, the use of gate level logic encryption reduces the power overhead to an estimated 32.3% and the area overhead to 45.7% for the same implementation. The 22.7% difference in the power overhead and 11.3% difference in the area overhead are available for key expansion. The reduced overhead of gate level logic encryption permits the addition of key expansion to further increase the key combinations an adversary must search while maintaining a similar overhead budget to current methodologies.

5.2 Key Expansion: Transmission Gate Topology Expanded

Figure 8:
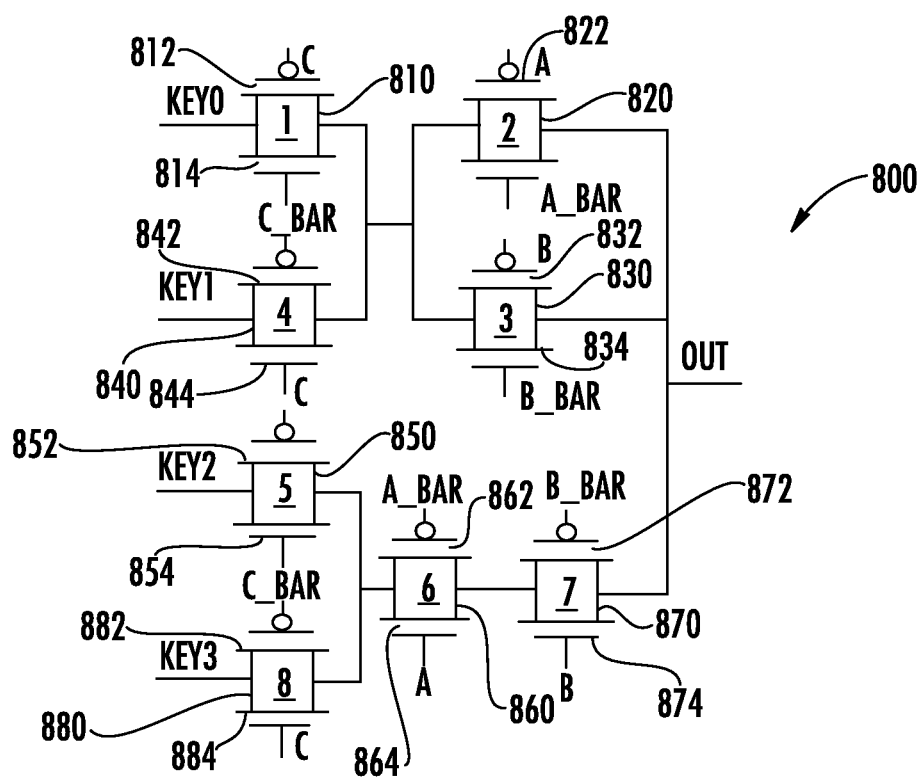
FIG. 8 shows a two level transmission gate topology for AND/NAND.

The transmission gate topology can be expanded to encrypt multiple gates by realizing logic simplifications similar to an AND-OR-invert (AOL, which may be reliant on the controllability of the inputs. FIG. 8 shows the transmission gate structure with the addition of two 2×1 MUX structures to allow for 12 two gate logic configurations, shown in Table 7.

TABLE 7

| A | B | C | 1 AND-OR | 2 AND-XOR | 3 AND-AND | 4 NAND-OR | 5 NAND-XOR | 6 NAND-AND | 7 AND-NOR | 8 AND-XNOR | 9 AND-NAND | 10 NAND-NOR | 11 NAND-XNOR | 12 NAND-NAND |
|---|---|---|---|---|---|---|---|---|---|---|---|---|---|---|
| 0 | 0 | 0 | 0 | 0 | 0 | 1 | 1 | 0 | 1 | 1 | 1 | 0 | 0 | 1 |
| 0 | 0 | 1 | 1 | 1 | 0 | 1 | 0 | 1 | 0 | 0 | 1 | 0 | 1 | 0 |
| 0 | 1 | 0 | 0 | 0 | 0 | 1 | 1 | 0 | 1 | 1 | 1 | 0 | 0 | 1 |
| 0 | 1 | 1 | 1 | 1 | 0 | 1 | 0 | 1 | 0 | 0 | 1 | 0 | 1 | 0 |
| 1 | 0 | 0 | 0 | 0 | 0 | 1 | 1 | 0 | 1 | 1 | 1 | 0 | 0 | 1 |
| 1 | 0 | 1 | 1 | 1 | 0 | 1 | 0 | 1 | 0 | 0 | 1 | 0 | 1 | 0 |
| 1 | 1 | 0 | 1 | 1 | 0 | 0 | 0 | 0 | 0 | 0 | 1 | 1 | 1 | 1 |
| 1 | 1 | 1 | 1 | 0 | 1 | 1 | 1 | 0 | 0 | 1 | 0 | 0 | 0 | 1 |

This topology may implement 16 logical functions when functions not realized by two standard gates are considered, such as a constant logic high or logic low output. Such a structure provides the potential to reduce overhead while expanding the obfuscated area of a circuit. The OR/NOR transmission gate topology may also be used as the initial gate in any of the following topologies as well.

Figure 9:
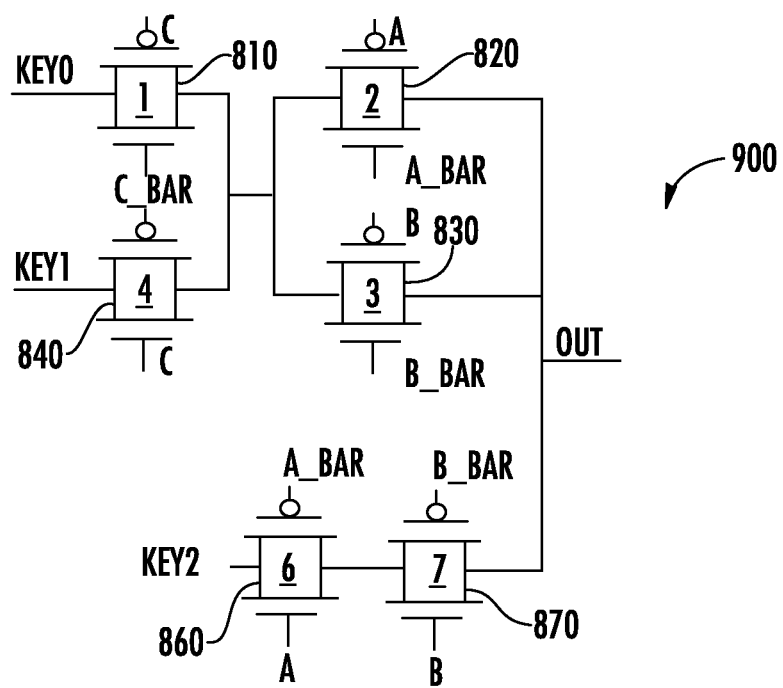
FIGS. 9-12 show variations of the two level transmission gate topology.
Figure 10:
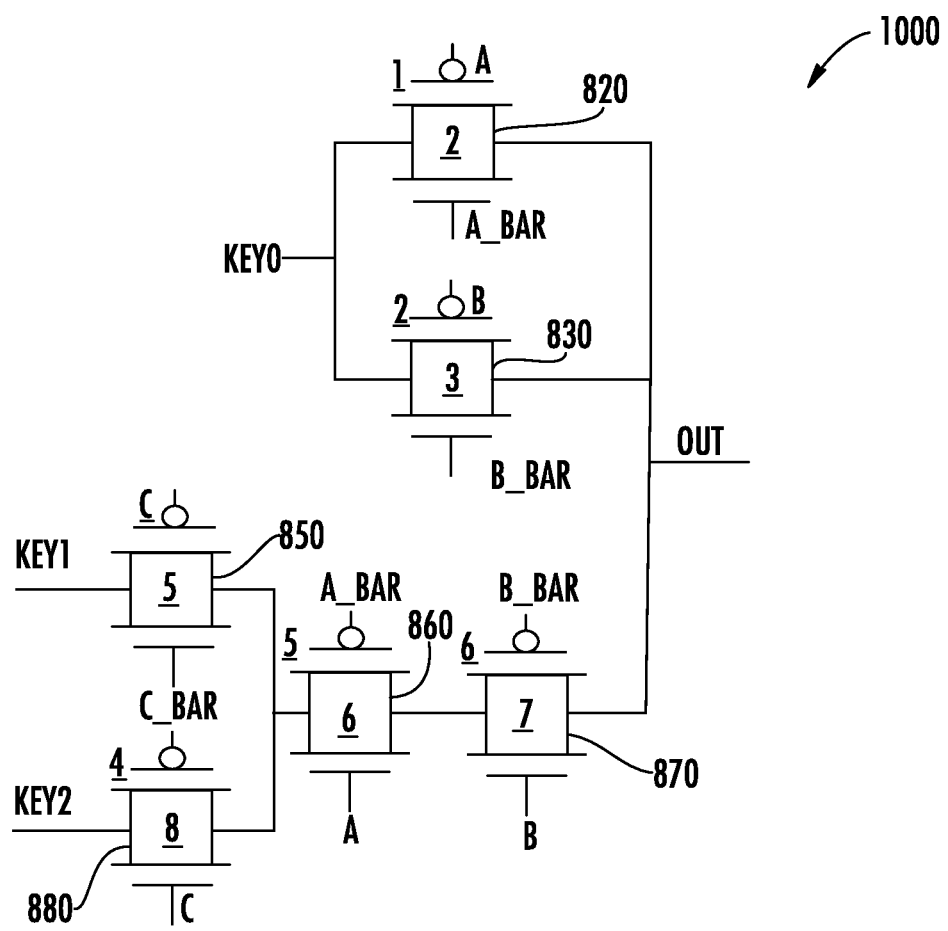

If overhead is a concern, other two level logic structures may be realized by eliminating one, or both, of the 2×1 MUX structures. FIG. 9 shows a configuration capable of realizing eight logic functions with the removal of the lower 2×1 MUX from the topology shown in FIG. 8. Such a topology is able to implement functions 1, 6, 7, and 8 from Table 7. Functions 3, 4, 9, and 10 could also be implemented by switching the configuration to what is shown in FIG. 10.

FIG. 8 shows two level transmission gate topology 800 for AND/NAND followed by any standard two input gate with signal C connected to the remaining input. The two level transmission gate topology shown in FIG. 8 may include logic to supply KEY0 to the gate output when input A or B is connected to ground and C is connected to ground, logic to pass KEY1 to OUT when input A or B is connected to ground and C is connected to VDD, logic to pass KEY2 when inputs A and B are connected to VDD and C is connected to ground, and logic to pass KEY3 when inputs A and B are connected to VDD and C is connected to VDD.

The path beginning with KEY0 connects one terminal of a PMOS 812 shorted with one terminal of an NMOS 814 that form a first transmission gate 810. The PMOS 812 and NMOS 814 of the first transmission gate 810 receive inputs C and C_BAR, respectively. The PMOS 812 and NMOS 814 each have a second terminal shorted together that connects to the shorted terminal of two PMOS transistors 822, 832 and two NMOS transistors 824, 834, with each PMOS/NMOS pair forming an additional second and third transmission gate 820, 830. The PMOS and NMOS transistors 822, 832, 824, 834 of the second and third transmission gates 820, 830 receive inputs A and A_BAR and B and B_BAR, respectively. Both the second and third transmission gates 820, 830 include PMOS and NMOS transistors 822, 832, 824, 834 each with a second terminal shorted together that connects to the output OUT of the gate.

The path beginning with KEY1 connects one terminal of a PMOS 842 shorted with one terminal of an NMOS 844 that form transmission gate four 840 with inputs C_BAR and C, respectively. The PMOS 842 and NMOS 844 of the fourth transmission gate 840 then have terminal connections that connect to the input terminal of the second and third transmission gates 820, 830 with inputs A and A_BAR and B and B_BAR, respectively. The PMOS 822, 832 and NMOS 824, 834 transistors from the second and third transmission gates 820, 830 are then shorted to form a terminal connection to the output OUT of the gate.

The path beginning with KEY2 connects to the terminal of a PMOS 852 and NMOS 854 with inputs C and C_BAR, respectively, that forms a fifth transmission gate 850. The fifth transmission gate 850 then connects to the terminal of a PMOS 862 and NMOS 864 to form sixth transmission gate 860, with inputs A_BAR and A, respectively. The sixth transmission gate 860 then connects to the terminals of a PMOS 872 and a NMOS 874 transistor that form a seventh transmission gate 870 with inputs B_BAR and B, respectively. The terminals from the seventh transmission gate 870 then connect to the output of the gate, labeled OUT.

The path beginning with KEY3 connects to the shorted terminal of a PMOS 882 and NMOS 884 with inputs C and C_BAR, respectively, that form an eighth transmission gate 880. The eighth transmission gate 880 then connects to the shorted terminal of a PMOS 862 and NMOS 864 that form the sixth transmission gate 860, with inputs A_BAR and A, respectively. The sixth transmission gate 860 then connects to the shorted terminals of a PMOS 872 and a NMOS 874 transistor that form the seventh transmission gate 870 with inputs B_BAR and B, respectively. The terminals from the seventh transmission gate 870 then connect to the output of the gate, labeled OUT.

FIG. 9 shows two level transmission gate topology capable of implementing functions 1, 6, 7, and 8 from Table 7. For sake of clarity transmission gate reference numbering from the topology in FIG. 8 have been repeated in FIGS. 9-12, and similar gates are referred to as transmission gate one and transmission gate two with reference to FIGS. 9-12 in place of first and second transmission gates in FIG. 8.

The two level transmission gate topology 900 shown in FIG. 9 may use logic to supply KEY0 to the gate output when input A or B is connected to ground and C is connected to ground, logic to pass KEY1 to OUT when input A or B is connected to ground and C is connected to VDD, and logic to pass KEY2 when inputs A and B are connected to VDD.

The path beginning with KEY0 connects to the terminal of a PMOS 812 and NMOS 814 to form the transmission gate one 810 with inputs C and C_BAR, respectively. The transmission gate one 810 is then connected to the terminals of a PMOS 822 and NMOS 824 forming the transmission gate two 820 with inputs A and A_BAR, respectively. The transmission gate one 810 also connects to another PMOS 832 and NMOS 834 with shorted terminals, forming the transmission gate three 830, with inputs B and B_BAR to the PMOS and NMOS transistors, respectively. Both transmission gates two and three 820, 830 short the second PMOS and NMOS terminals 822, 824, 832, 834 to the output OUT of the gate.

The path beginning with KEY1 connects to the shorted terminals of a PMOS 842 and NMOS 844 with inputs C_BAR and C, respectively, forming the transmission gate four 840. The transmission gate four 840 connects to two pairs of shorted PMOS and NMOS terminals 822, 824, 832, 834, forming the transmission gates two and three 820, 830, with inputs A and A_BAR and B and B_BAR, respectively. The second terminals of the PMOS and NMOS transistors 822, 824, 832, 834 in both the transmission gates two and three 820, 830 are then connected to the output of the gate OUT.

The logic that connects KEY2 to the output node consists of KEY2 applied to one terminal of a PMOS 862 shorted with one terminal of an NMOS 864 that form the transmission gate six 860. The PMOS 862 and NMOS 864 receive inputs A_BAR and A, respectively. The second shorted terminal connection of the PMOS 872 and NMOS 874 transistors is connected to one terminal of a PMOS shorted with one terminal of an NMOS that form the transmission gate seven 870. The PMOS and NMOS of transmission gate seven 870 receive inputs B_BAR and B, respectively. The PMOS 872 and NMOS 874 of the transmission gate seven 870 of the bottom path each have a second terminal shorted together that connects to the output OUT of the gate.

FIG. 10 shows two level transmission gate topology 1000 capable of implementing functions 3, 4, 9, and 10 from Table 7. The topology 1000 is similar to the topology 800 in FIG. 8 but without the first and second gates 810, 820.

The two level transmission gate topology 1000 shown in FIG. 10 may use logic to supply KEY0 to the gate output when input A or B is connected to ground, logic to pass KEY1 to OUT when input A and B are connected to VDD and C is connected to ground, and logic to pass KEY2 when inputs A and B are connected to VDD and C is connected to VDD.

The upper path connects KEY0 to one terminal of a PMOS 822 shorted with one terminal of an NMOS 824 that form a transmission gate two 820. The PMOS 822 and NMOS 824 receive inputs A and A_BAR, respectively. The PMOS 822 and NMOS 824 each have a second terminal shorted together that connects to the output OUT of the gate 820. The lower path passing through transmission gate three 820 connects KEY0 to one terminal of a PMOS 832 shorted with one terminal of an NMOS 834. The PMOS 832 and NMOS 834 receive inputs B and B_BAR, respectively. The PMOS 832 and NMOS 834 each have a second terminal shorted together that connects to the output OUT of the gate.

The path beginning with KEY1 connects the terminal of a PMOS 852 and NMOS 854 to form transmission gate five 850 with inputs C and C_BAR, respectively. Transmission gate five 850 is then connected to the shorted terminals of a PMOS 862 and a NMOS 864 forming transmission gate six 860 with inputs A and A_BAR, respectively. The second shorted terminal connection of the PMOS 862 and NMOS 864 transistors of transmission gate six 860 is connected to one terminal of a PMOS 872 shorted with one terminal of an NMOS 874 that form transmission gate seven 870. The PMOS 872 and NMOS 874 of transmission gate seven 870 receive inputs B_BAR and B, respectively. The second shorted terminals of transmission gate seven 870 connect to the output OUT of the gate.

The path beginning with KEY2 shorts the terminal of a PMOS 882 with the terminal of a NMOS 884 to form transmission gate eight 880 with inputs C_BAR and C, respectively. The PMOS 882 and NMOS 884 then have another shorted connection that connects to a shorted PMOS 882 and NMOS 882 terminal, creating transmission gate six 860, with inputs A_BAR and A, respectively. The second shorted terminal connection of the PMOS 862 and NMOS 864 transistors of transmission gate six 860 is connected to one terminal of a PMOS 872 shorted with one terminal of an NMOS 874 that form transmission gate seven 870. The PMOS 872 and NMOS 874 of transmission gate seven 870 receive inputs B_BAR and B, respectively. The second shorted terminals of transmission gate seven 870 connect to the output OUT of the gate.

Figure 11:
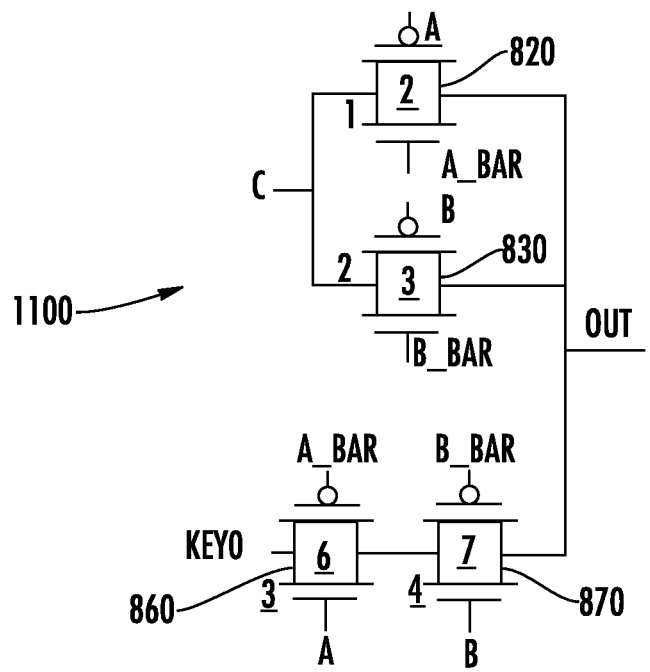
Figure 12:
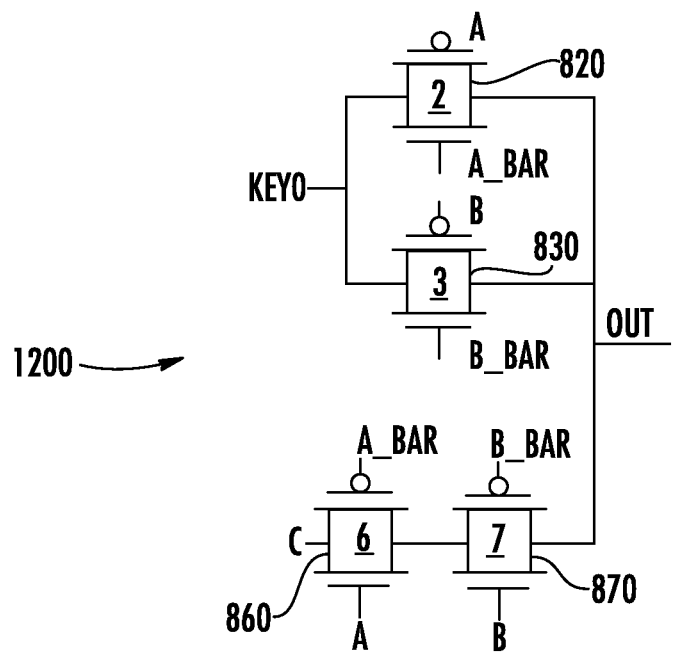

Finally, the original transmission gate topology 800 may be used in the configurations 1100, 1200 shown in FIGS. 11 and 12 to realize two logic functions. The topology 1100 shown in FIG. 11 may be capable of implementing functions 1 and 6 from Table 7, while the topology 1200 shown in FIG. 12 is able to implement functions 3 and 4. Such a scenario would be best suited for applications where overhead is the primary concern and the number of obfuscated functions is not as much of a concern.

FIG. 11 shows two level topology capable of implementing functions 1 and 6 from Table 7.

The transmission gate topology shown in FIG. 11 includes logic to supply input C to the gate output OUT, when input A or B is connected to ground and logic to pass KEY1 to OUT when inputs A and B are both connected to VDD.

The logic passing the value of C to OUT includes two parallel paths. The upper path through transmission gate two 820 connects C to one terminal of a PMOS 822 shorted with one terminal of an NMOS 824. The PMOS 824 and NMOS 824 receive inputs A and A_BAR, respectively. The PMOS 822 and NMOS 824 each have a second terminal shorted together that connects to the output OUT of the gate 820. The lower path passing through transmission gate three 830 connects C to one terminal of a PMOS 832 shorted with one terminal of an NMOS 834 to form a transmission gate three 830. The PMOS 832 and NMOS 834 receive inputs B and B_BAR, respectively. The PMOS 832 and NMOS 834 each have a second terminal shorted together that connects to the output OUT of the gate 830.

The logic that connects KEY0 to the output node consists of one terminal of a PMOS 862 shorted with one terminal of an NMOS 864 that form a transmission gate six 860. The PMOS 862 and NMOS 864 receive inputs A_BAR and A, respectively. The second shorted terminal connection of transmission gate six 860 is connected to one terminal of a PMOS 872 shorted with one terminal of an NMOS 874 that form transmission gate seven 870. The PMOS 872 and NMOS 874 receive inputs B_BAR and B, respectively. The PMOS 872 and NMOS 874 of transmission gate seven 870 each have a second terminal shorted together that connects to the output OUT of the gate 870.

FIG. 12 shows two level topology 1200 capable of implementing functions 3 and 4 from Table 7.

The transmission gate topology 1200 shown in FIG. 12 may use logic to supply input KEY0 to the gate output OUT when input A or B is connected to ground and logic to pass C to OUT when inputs A and B are both connected to VDD.

The logic passing the value of KEY0 to OUT may use two parallel paths. The upper path connects KEY0 to one terminal of a PMOS 822 shorted with one terminal of an NMOS 824 that form transmission gate two 820. The PMOS 822 and NMOS 824 receive inputs A and A_BAR, respectively. The PMOS 822 and NMOS 824 each have a second terminal shorted together that connects to the output OUT of the gate 820. The lower path passing through transmission gate three 830 connects KEY0 to one terminal of a PMOS 832 shorted with one terminal of an NMOS 834 to form a transmission gate three 830. The PMOS 832 and NMOS 834 receive inputs B and B_BAR, respectively. The PMOS 832 and NMOS 834 each have a second terminal shorted together that connects to the output OUT of the gate.

The logic that connects C to the output node includes C applied to one terminal of a PMOS 862 shorted with one terminal of an NMOS 864 that form transmission gate six 860. The PMOS 862 and NMOS 864 receive inputs A_BAR and A, respectively. The second shorted terminal connection of transmission gate six 860 is connected to one terminal of a PMOS 872 shorted with one terminal of an NMOS 874 that form transmission gate seven 870. The PMOS 872 and NMOS 874 receive inputs B_BAR and B, respectively. The PMOS 872 and NMOS 874 of transmission gate four each have a second terminal shorted together that connects to the output OUT of the gate 870.

While the invention has been described with reference to the embodiments above, a person of ordinary skill in the art would understand that various changes or modifications may be made thereto without departing from the scope of the claims.

The invention claimed is:

1. A circuit having a gate topology comprising:
   a logical gate with integrated key transistors having a logic structure that renders the circuit functional depending on inputs provided to the key transistors, wherein the key transistors comprise at least a PMOS stack and an NMOS stack, and wherein:
   the PMOS stack comprises a first PMOS switch having an input A and a second PMOS switch having an input B, wherein both the first and the second PMOS switches have sources to a voltage source and drains that serve as a source to a third PMOS switch, and wherein the third PMOS switch also receives an input KEY0 and has a drain that connects to an output OUT of the logical gate;
   the NMOS stack comprises a first NMOS switch having the input A and a second NMOS switch having the input B, wherein both the first and the second NMOS switches have sources to ground and drains that serve as a source to a third NMOS switch, and wherein the third NMOS switch also receives the input KEY0 and has a drain that connects to the output OUT of the logical gate; and
   input of a correct input KEY0 outputs a correct output OUT that renders the circuit functional, and input of an incorrect input KEY0 outputs an incorrect output OUT that renders the circuit not functional.

2. The circuit having the gate topology of claim 1, wherein when the input KEY0 is set to 0, the PMOS stack is activated allowing the gate topology to act as a NAND gate.

3. The circuit having the gate topology of claim 1, wherein when the input KEY0 is set to 1, the NMOS stack is activated allowing the gate topology to act as a NOR gate.

4. The circuit having the gate topology of claim 1, wherein depending on a value of the input KEY0, one or the other of the PMOS stack and the NMOS stack is activated while the other one of the PMOS stack and the NMOS stack does not generate the output OUT.

5. The circuit having the gate topology of claim 1, further comprising a shared functionality such that depending on a value of the input A and the input B, the PMOS stack and the NMOS stack share functionality between their first and second switches.

6. The circuit having the gate topology of claim 1, further comprising a shared functionality such that when both the input A and the input B are set to VDD, the NMOS stack is connected to ground and has a drain connected to another NMOS with the input A.

7. The circuit having the gate topology of claim 1, further comprising a shared functionality such that when both the input A and the input B are set to ground, the PMOS stack is connected to VDD and has a drain connected to another PMOS with the input A.

8. The circuit having the gate topology of claim 1, further comprising a shared functionality between implemented logic of the PMOS stack and the NMOS stack.

\* \* \* \* \*